US009726298B2

(12) United States Patent
Reichler et al.

(10) Patent No.: US 9,726,298 B2
(45) Date of Patent: Aug. 8, 2017

(54) VALVE

(75) Inventors: Jan Reichler, Constance (DE); Simon Maurmaier, Stuttgart (DE); Mathias Moll, Boeblingen (DE)

(73) Assignee: EISENMANN AG, Boeblingen (DE)

( * ) Notice: Subject to any disclaimer, the term of this patent is extended or adjusted under 35 U.S.C. 154(b) by 0 days.

(21) Appl. No.: 14/118,282

(22) PCT Filed: May 3, 2012

(86) PCT No.: PCT/EP2012/001894
§ 371 (c)(1),
(2), (4) Date: Feb. 11, 2014

(87) PCT Pub. No.: WO2012/156032
PCT Pub. Date: Nov. 22, 2012

(65) Prior Publication Data
US 2014/0183383 A1 Jul. 3, 2014

(30) Foreign Application Priority Data
May 19, 2011 (DE) .................. 10 2011 101 978

(51) Int. Cl.
F16K 31/122 (2006.01)
F16K 27/02 (2006.01)
(Continued)

(52) U.S. Cl.
CPC .......... *F16K 31/1225* (2013.01); *B05B 1/306* (2013.01); *F16K 27/02* (2013.01); *B05B 5/16* (2013.01)

(58) Field of Classification Search
CPC ........ B05D 1/306; B05D 5/16; B05D 1/3046; F16K 31/1225; F16K 27/02; F16K 31/122
(Continued)

(56) References Cited

U.S. PATENT DOCUMENTS 3,554,088 A * 1/1971 Bruyn .............................. 92/128
3,815,820 A * 6/1974 Probst ........................... 239/707
(Continued)

FOREIGN PATENT DOCUMENTS

DE 2 205 687 8/1972
DE 38 08 478 C2 9/1989
(Continued)

OTHER PUBLICATIONS

Machine Translation of DE 10 2006 025 549, accessed Feb. 14, 2015.*

*Primary Examiner* — Craig Schneider
*Assistant Examiner* — Andrew J Rost
(74) *Attorney, Agent, or Firm* — Factor Intellectual Property Law Group, Ltd.

(57) ABSTRACT

A valve for use in conjunction with an application device having a valve housing and a valve spindle which bears a sealing element at a first free end outside the valve housing and, within the valve housing, is mounted displaceably between a closed position and a release position. The valve spindle includes at least one first piston element and at least one second piston element, wherein the first piston element is guided in a first piston space and the second piston element is guided in a second piston space, said piston spaces being bounded by the valve housing. A pressure fluid can be supplied in each case to the first piston space and to the second piston space in such a manner that a force acting in the same direction is exerted on the first piston element and on the second piston element.

11 Claims, 2 Drawing Sheets

(51) Int. Cl.
*B05B 1/30* (2006.01)
*B05B 5/16* (2006.01)

(58) Field of Classification Search
USPC .................. 251/62, 63.5, 63; 239/690–708
See application file for complete search history.

(56) References Cited

U.S. PATENT DOCUMENTS

| | | | |
|---|---|---|---|
| 4,596,267 A * | 6/1986 | Tosseghini .................. | 137/270 |
| 4,776,562 A | 10/1988 | Kalaskie et al. | |
| 4,840,347 A | 6/1989 | Ariizumi et al. | |
| 4,903,939 A | 2/1990 | Ariizumi et al. | |
| 5,390,895 A * | 2/1995 | Iwabuchi ...................... | 251/60 |
| 6,585,226 B2 * | 7/2003 | Fukano et al. ................ | 251/28 |
| 7,011,290 B2 * | 3/2006 | Rodrigues ............ | F16K 31/143 |
| | | | 251/63.5 |
| 7,143,956 B2 * | 12/2006 | Fukano ........................ | 239/119 |
| 7,971,599 B2 * | 7/2011 | Aoyama et al. ............. | 137/270 |
| 2006/0197049 A1 * | 9/2006 | Hamada et al. ............. | 251/285 |
| 2007/0290154 A1 * | 12/2007 | Aoyama .................. | F16K 7/14 |
| | | | 251/63 |

FOREIGN PATENT DOCUMENTS

| | | |
|---|---|---|
| DE | 10 2006 025 549 A1 | 12/2007 |
| EP | 0 309 081 B1 | 3/1989 |
| EP | 1 154 182 A2 | 11/2001 |
| EP | 1 801 478 A2 | 6/2007 |
| FR | 2 127 055 A5 | 10/1972 |

* cited by examiner

VALVE

RELATED APPLICATIONS

This application claims the filing benefit of International Patent Application No. PCT/EP2012/001894, filed May 3, 2012, which claims the filing benefit of German Patent Application No. 10 2011 101 978.6, filed May 19, 2011, the contents of both of which are incorporated herein by reference.

FIELD OF THE INVENTION

The invention relates to a valve for use in conjunction with an application device, comprising:
a) a valve housing;
b) a valve spindle, which bears a sealing element at a first free end outside the valve housing and is mounted displaceably between a closed position and a release position within the valve housing.

BACKGROUND OF THE INVENTION

Such valves are known for example from DE 10 2006 025 549 A1 and are used in application devices, for example spray guns, to control the flow of coating material.

The valve described in DE 10 2006 025 549 A1 is used in particular in electrostatically operating application devices. In such application devices the coating material is drawn electrostatically onto an article to be coated in that the application device is at a high electric potential, whereas the article to be coated is at frame potential.

The sealing element of the valve cooperates with a valve seat, which it closes or releases when the valve spindle in the valve housing takes up its closed position or its release position. The valve spindle in this case takes up its closed position as a rule under initial tension; a switchover between the closed position and the release position of the valve spindle is effected in known valves by means of a pressure fluid in the form of compressed air, which as a rule is at a moderate working pressure of approximately 6 bar.

For the switchover between the closed position and the release position of the valve spindle generally short switching times are desirable, which in known valves are however not always achieved at the pressures employed.

It is therefore an object of the invention to provide a valve of the type described in the introduction that enables faster switchover times between the closed position and the release position of the valve spindle.

SUMMARY OF THE INVENTION

This object may be achieved in a valve of the type described in the introduction in that
c) the valve spindle comprises at least one first piston element and one second piston element;
d) the valve housing delimits at least one first piston space and one second piston space;
e) the first piston element is guided in the first piston space and the second piston element is guided in the second piston space;
f) a pressure fluid may be supplied in each case to the first piston space and to the second piston space in such a manner that a force acting in the same direction is exerted on the first piston element and on the second piston element.

By virtue of the at least two piston elements the effective area of the valve spindle, on which the pressure fluid may exert a force in order to move the valve spindle, may be effectively increased. As a consequence of this the movement of the valve spindle accelerates, thereby shortening the switching time of the valve without there being any need to raise the working pressure of the pressure fluid or increase the overall dimensions of the valve for this purpose.

It is advantageous if the first and the second piston space are connected by radial channels to an outer circumferential groove in the valve housing. If the valve, when in use, is seated in a conventional manner in a valve receiver, there is then formed between the inner lateral surface thereof and the circumferential groove an annular space, to which for actuating the valve a pressure fluid may then be fed, which passes from there both to the first and to the second piston space.

It is particularly advantageous if sealing means are provided, which seal the first piston element and/or the second piston element against the inner wall of the associated first or second piston space and comprise an elastomer material, in particular a perfluorinated elastomer material. By said means a particularly good sealing effect may be achieved, with the result that a pressure drop in the piston spaces is avoided and the pressure fluid is effectively utilized.

From a manufacturing standpoint it is advantageous if the valve housing is of a multipart construction.

It is equally advantageous if the valve spindle is of a multipart construction.

Valves have become established, in which the second free end of the valve spindle is in contact through the valve housing with the environment. In design terms this is justified if for example an opening is left in the valve housing for pressure equalization without its being covered by a further housing or the like. This occurs frequently in order to enable the unit that receives the valve to be made as compact as possible.

When using such valves in conjunction with application devices that are at a high electric potential it is problematic if the valve spindles are made of conductive, mostly metal materials. The exposed second end of the valve spindle may lead to undesirable voltage flashover, which is possibly linked to sparking. The latter represents a high safety risk, particularly in paint shops, because in the worst-case scenario sparks may trigger an explosion.

It is therefore advantageous if a second free end of the valve spindle is in contact through the valve housing with the environment and is manufactured from an electrically highly insulating insulation material.

In practice it has proved advantageous if the insulation material is a plastics material, in particular a plastics material from the group of polyether ketones, preferably a polyaryl ether ketone (PEK) or a polyetherether ketone (PEEK).

Alternatively the insulation material may be a ceramic, in particular a glazed fine ceramic.

With regard to the sealing element, on the other hand, it is advantageous if this is manufactured from an electrically conductive material, in particular from a doped plastics material. In this way a potential equalization may occur between the valve spindle and a valve seat.

In this case the sealing element is manufactured preferably from PA12 graphite.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

There now follows a detailed description of an embodiment of the invention with reference to the drawings. The drawings show in.

DETAILED DESCRIPTION OF THE PRESENT INVENTION

Figure 1:
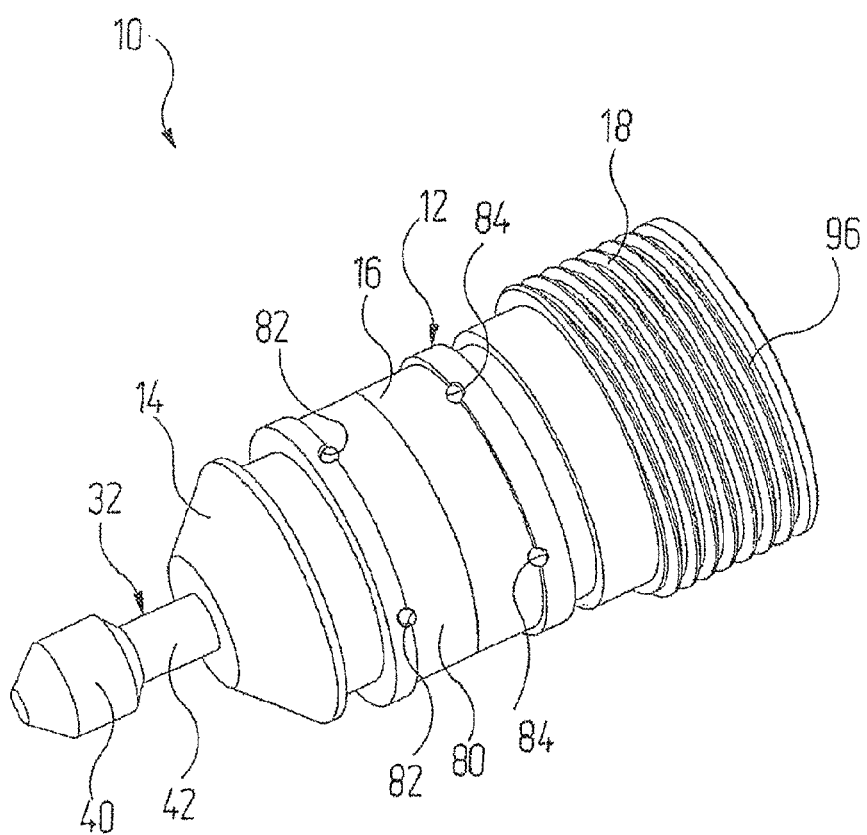
FIG. 1 a perspective view of a valve.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 2:
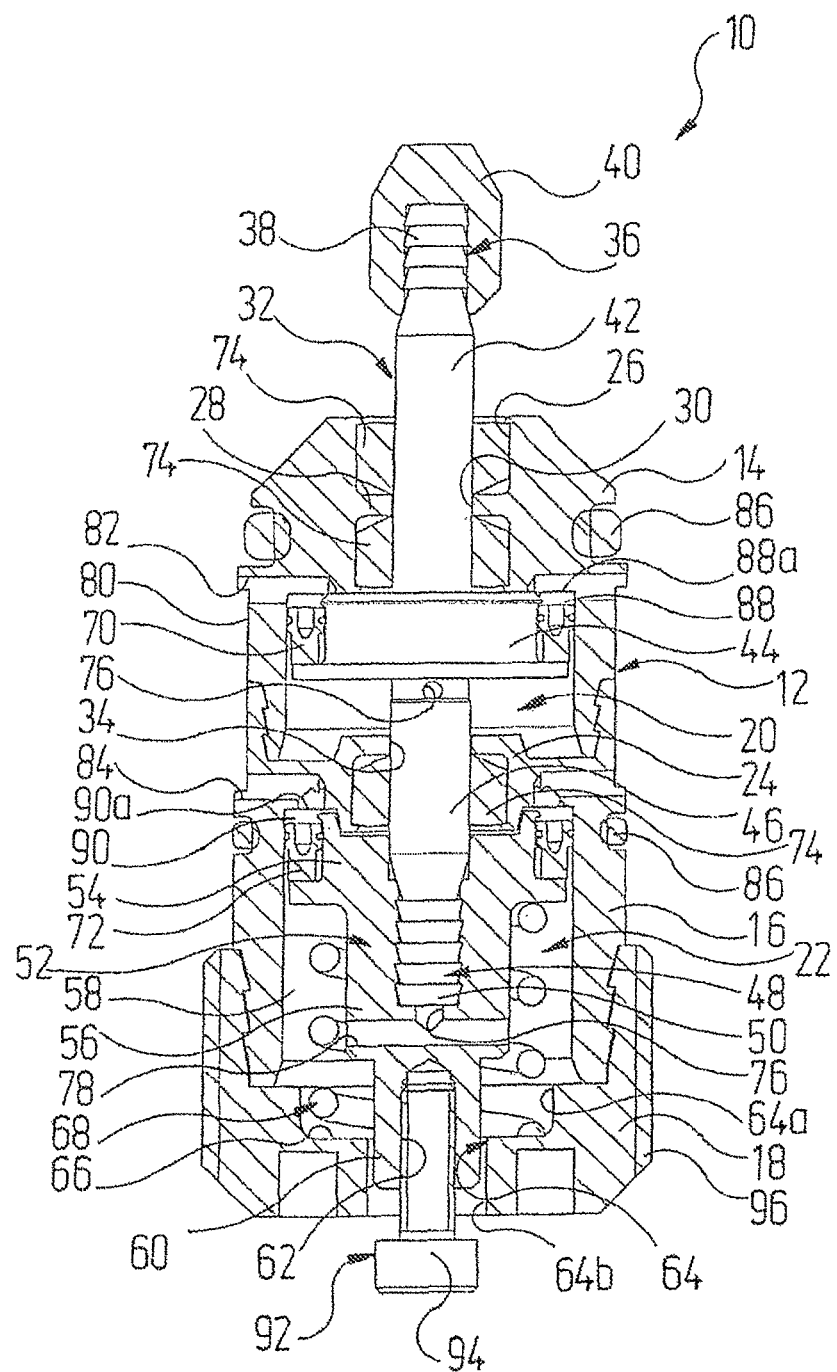
FIG. 2 a longitudinal section of the valve of FIG. 1.

In FIGS. 1 and 2 a valve that is actuable by means of a pressure fluid, in particular by means of compressed air, is denoted as a whole by 10. The valve 10 comprises a multipart valve housing 12 having a first housing part 14, which is in the shape of a truncated cone at the front end, a tubular second housing part 16 and a third cupular housing part 18, which are arranged coaxially with one another and connected to one another by not specifically denoted detent connections. In a modification the valve housing 12 may be alternatively of an integral construction.

The valve housing 12 delimits a first piston space 20 and a second piston space 22, which in relation to the valve 10 are arranged one axially behind the other and in the present embodiment have an identical cross section. The first piston space 20 and the second piston space 22 are separated by an intermediate wall 24, which is enclosed by the second housing part 16.

A passage 26 extends from outside through the first housing part 14, opens out into the first piston space 20 and runs coaxially therewith. The passage 26 in this case has a radially inwardly projecting guide collar 28, which defines a guide passage 30 for a valve spindle 32 that is mounted displaceably within the valve housing 12. The intermediate wall 24 has a guide passage 34, which is complementary to, and coaxial with, the guide passage 30 in the first housing part 14.

The valve spindle 32 on a spindle nose end 36 has a detent portion 38, which is situated outside the valve housing 12 and formed by a plurality of conical detent lugs. A sealing element 40 is latched on the valve spindle 32 by being mounted onto the detent portion 38.

The detent portion 38 of the valve spindle 32 is followed by a first guide portion 42 with a circular cross section that extends in the guide passage 30, complementary to it, in the first housing part 14 and verges into a circumferential, radially protruding first piston flange 44, which forms a first piston element and is enclosed so as to be locked against movement by the valve spindle 32. The first piston flange 44 is situated in the first piston space 20 and has in axial direction an extent that is shorter than the length of the first piston space 20 in this direction.

The first piston flange 44 is adjoined by a second guide portion 46 of the valve spindle 32 that likewise has a circular cross section and extends through the second guide passage 34, complementary to it, in the intermediate wall 24.

The valve spindle 32 may be of an integral construction but in the present embodiment is of a multipart construction, for which purpose the second guide portion 46 in the region of the second piston space 22 verges into a detent attachment 48, which is remote from the spindle nose end 36 and, like the latter, forms a detent portion of the valve spindle 32 that is denoted by 50 and comprises a plurality of conical detent lugs.

Mounted and latched onto this detent attachment 48 is a piston end piece 52 which, viewed in axial direction towards the third housing part 18 of the valve housing 12, comprises three portions. The first portion takes the form of a second piston flange 54, which is situated in the second piston space 22 and in axial direction has an extent that is shorter than the length of the second piston space 22 in this direction. The second piston flange 54 therefore forms a second piston element of the valve 10 and is likewise enclosed so as to be locked against movement by the valve spindle 32.

The second portion of the piston end piece 52 is a guide portion 56. This has a smaller cross section than the second piston flange, with the result that an annular space 58 remains between the guide portion 56 and the inner lateral surface of the second piston space 22.

Finally, an end portion 60 of the piston end piece 52 forms the third portion thereof. This in turn has a reduced cross section compared to the guide portion 56 and at its free front end has a threaded blind hole 62. The end portion 60 of the piston end piece 52 projects into a stepped passage 64 in the third housing part 18 that in turn comprises a first stepped portion 64a and a second stepped portion 64b with a smaller cross section. The first stepped portion 64a in this case faces the second piston space 22, so that at the transition between the first and the second stepped portion 64a, 64b an annular seating face 66 is formed.

Lying against this annular seating face 66 is a helical spring 68, which extends into the second piston space 22 and at its opposite end presses against the piston flange 54 of the piston end piece 52.

By means of the helical spring 68 the valve spindle 32 is pressed by spring loading into a closed position, in which the valve spindle 32 is extended out of the valve housing 12.

The first piston flange 44 and the second piston flange 54 are disposed on the valve spindle 32 in such a way that in the closed position of the valve 10 they lie in the direction of the sealing element 40 against the inner end faces of the first and the second piston spaces 20, 22 respectively, as may be seen in FIG. 2.

From this closed position the valve spindle 32 may be retracted into the valve housing 12 into a release position. At most, the valve spindle 32 may in this case be retracted far enough into the valve housing 12 for the first piston flange 44 to lie in the direction of the third housing part 18 against the inner end face of the intermediate wall 24 that faces the first piston space 20.

The first piston flange 44 and the second piston flange 54 in circumferential direction each carry a sealing ring 70 and 72, which seal the piston flanges 44, 54 against the inner wall of the first piston space 20 and the second piston space 22 respectively. Furthermore, at the guide passage 30 of the first housing part 14 and at the guide passage 34 in the intermediate wall 24 annular seals 74 are provided, which in a sealing manner guide the first guide portion 42 and/or the second guide portion 46 of the valve spindle 32.

In this manner the first piston space 20 is sealed off in the direction of the passage 26 in the first housing part 14 from the environment and in the direction of the guide passage 34 in the intermediate wall 24 from the second piston space 22.

In contrast thereto, the second piston space 22 is connected by the stepped passage 64 in the third housing part 18 to the environment.

In order to enable a pressure equalization during a movement of the valve spindle 32 from the closed position into the release position, there are provided in the valve spindle 32 channels 76 and in the piston end piece 52 channels 78, which together create a flow path between the first piston space 20 and the second piston space 22.

The first and the second housing part 14 and 16 of the valve housing 12, when fitted together, define an outer circumferential groove 80 with a relatively large longitudinal extent, in the groove base of which are cut radial channels 82 in the first housing part 16 and radial channels 84 in the second housing part 16, which radial channels are in each case distributed uniformly in circumferential direction. Via the radial channels 82 the first piston space 20 communicates with the circumferential groove 80, while via the radial channels 84 the second piston space 22 is connected to the circumferential groove 80.

In axial direction the circumferential groove 80 is flanked by two sealing rings 86, which are seated in grooves that are not specifically provided with a reference character. Once the valve 10 has been inserted into a valve receiver, which is not illustrated here, these sealing rings 86 together with the circumferential groove 80 and the inner lateral surface of the valve receiver delimit an annular pressure chamber. To actuate the valve, this pressure chamber is loaded with a pressure fluid in the form of compressed air, which penetrates through the radial channels 82, 84 into the piston spaces 20 and 22 and, there, exerts a force on the first piston flange 44 and on the second piston flange 54.

The radial channels 82, 84 in this case open out into the respective piston space 20, 22 in each case at the front end facing the sealing element 40 on the valve spindle 32.

In this way the compressed air reaches in each case an annular thrust face 88*a* or 90*a* of the first piston flange 44 or the second piston flange 54, which thrust faces are oriented in each case in the direction of the sealing element 40 on the valve spindle 32. In the present embodiment the thrust faces 88*a* and 90*a* are formed in each case by an annular attachment 88 or 90 on the sealing rings 70 or 72 of the first and the second piston flange 44 and 54, which likewise effect sealing against the inner wall of the respective piston space 20, 22. The annular attachments 88 and 90 are manufactured for example from a perfluorinated elastomer in the form of perfluoro-natural rubber. Perfluoro-natural rubber is generally known by the abbreviations FFKM or FFPM.

Generally speaking, compressed air may be fed through the radial channels 82 and 84 to the first piston space 20 and to the second piston space 22 in such a way that a force acting in the same direction is exerted on the first piston element 20 and on the second piston element 22.

Once the loading with compressed air is terminated, the valve spindle 32 springs back into its closed position as a result of the spring action of the helical spring 68.

In order to be able to adjust the distance between the closed position and the release position of the sealing element 40 of the valve 10, a setting screw 92 is screwed into the threaded blind hole 62 of the piston end piece 52. The setting screw 92 extends through the portion 64*b* of the stepped passage 64 in the third housing part 18 so that its head 94 is disposed outside of the valve housing 12. Optionally, behind the valve 10 a mechanical stop may be provided, against which the head 94 of the setting screw 92, once the latter has been screwed completely into the threaded blind hole 62, lies when the valve spindle 32 and/or the sealing element 40 is situated in the release position.

A different release position may be assigned to the sealing element 40 by screwing the setting screw 92 out of the threaded blind hole 62.

In this way a further movement of the valve spindle 32 may be prevented, even if the first piston flange 44 still does not lie against the intermediate wall 24. The shortening of the travel of the valve spindle 32 corresponds to the extent to which the setting screw 92 is screwed out of the threaded blind hole 62.

The head 94 of the setting screw 92 may moreover be gripped by means of a tool, such as pliers, in order to move a possibly stiff valve spindle 32 manually in the valve housing 12 in order to free up a valve spindle 32 that has seized.

To enable the valve 10 to be fastened securely in a valve receiver, the third housing part 18 carries an external thread 96. This allows the valve 10 to be screwed into a suitably adapted valve receiver with a complementary internal thread.

The setting screw 92 and the piston end piece 52 jointly form the second end of the valve spindle 32 and are in contact with the environment through the stepped passage 64 in the third housing part 18 of the valve housing 12. If the valve 10 is used in an application device that is at a high electric potential, voltage flashover could occur via the setting screw 92 or the piston end piece 52 at the valve spindle 32.

In order to prevent this, at least the setting screw 92 is manufactured from a material that is electrically highly insulating. A suitable material for this is a non-conductive plastics material, in particular a plastics material from the group of polyether ketones. Here, it was possible to achieve good results with a polyaryl ether ketone (PEK) or a polyetherether ketone (PEEK). Alternatively a ceramic, in particular a glazed fine ceramic, may be provided.

Optionally the piston end piece 52 or even the entire valve spindle 32 and, in the latter case, the sealing element 40 too is also manufactured from such materials.

In the present case, for potential equalization between the valve spindle 32 and a valve seat of the valve receiver the sealing element 40 is made of an electrically conductive material. In practice conductive doped plastics materials, such as for example PA12 graphite, have proved successful as an electrically conductive material.

Compressed-air actuated paint valves are conventionally operated with compressed air at approximately 6 bar. By virtue of the two piston flanges 44 and 54 in the two piston spaces 20 and 22, the effective area of the valve spindle 32 for such compressed air is increased as a whole and the switching time thereof is shortened compared to previously known valves without larger dimensions of the valve 10 being required for this purpose.

Optionally the valve spindle 32 may additionally comprise one or more further piston elements, which are disposed in each case in a separate piston space and loadable in the previously described manner with a pressure fluid.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A valve for use in conjunction with an application device, comprising:
   a) a valve housing;
   b) a valve spindle, which bears a sealing element at a first free end outside the valve housing and is mounted displaceably between a closed position and a release position within the valve housing wherein
   c) the valve spindle comprises at least one first piston element and one second piston element;
   d) the valve housing delimits at least one first piston space and one second piston space;
   e) the first piston element is guided in the first piston space and the second piston element is guided in the second piston space;
   f) a pressure fluid may be supplied to the first piston space through at least one first piston space radial channel and to the second piston space through at least one second piston space radial channel in such a manner that a force acting in the same direction is exerted on the first piston element and on the second piston element,
   wherein the at least one first piston space radial channel and the at least one second piston space radial channel are connected by radial channels to an outer circumferential groove of the valve housing through which the pressure fluid is supplied.

2. The valve according to claim 1, further comprising: a seal which seals the first piston element and/or the second piston element against the inner wall of the associated first or second piston space and comprise an elastomer material.

3. The valve according to claim 1 wherein the valve housing is of a multipart construction.

4. The valve according to claim 1, wherein the valve spindle is of a multipart construction.

5. The valve according to claim 1, wherein a second free end of the valve spindle is in contact through the valve housing with an environment and is manufactured from an electrically highly insulating insulation material.

6. The valve according to claim 5, wherein the insulation material is a plastics material.

7. The valve according to claim 5, wherein the insulation material is a ceramic.

8. The valve according to claim 1, wherein the sealing element is manufactured from an electrically conductive material.

9. The valve according to claim 8, wherein the sealing element is manufactured from PA12 graphite.

10. A valve for use in conjunction with an application device, comprising:
    a) a valve housing;
    b) a valve spindle, which bears a sealing element at a first free end outside the valve housing and is mounted displaceably between a closed position and a release position within the valve housing wherein
    c) the valve spindle comprises at least one first piston element and one second piston element;
    d) the valve housing delimits at least one first piston space and one second piston space;
    e) the first piston element is guided in the first piston space and the second piston element is guided in the second piston space;
    f) a pressure fluid may be supplied in each case to the first piston space and to the second piston space in such a manner that a force acting in the same direction is exerted on the first piston element and on the second piston element,
    wherein the first piston space and the second piston space are connected by radial channels to an outer circumferential groove of the valve housing, and further wherein at least one channel is provided in the valve spindle and at least one channel is provided in a piston end piece to equalize pressure between the first piston space and the second piston space, and
    further wherein the pressure fluid is supplied to the first piston space and the second piston space through the radial channels from the outer circumferential groove of the valve housing.

11. The valve according to claim 10 wherein the at least one channel provided in the valve spindle is isolated from the radial channels.

* * * * *

UNITED STATES PATENT AND TRADEMARK OFFICE
CERTIFICATE OF CORRECTION

PATENT NO. : 9,726,298 B2  
APPLICATION NO. : 14/118282  
DATED : August 8, 2017  
INVENTOR(S) : Reichler et al.

Page 1 of 1

It is certified that error appears in the above-identified patent and that said Letters Patent is hereby corrected as shown below:

On the Title Page

Item (75) in the inventors section, please delete "Constance, (DE)" and insert -- Konstanz (DE) --.

Signed and Sealed this  
Fourteenth Day of November, 2017

Joseph Matal  
*Performing the Functions and Duties of the*  
*Under Secretary of Commerce for Intellectual Property and*  
*Director of the United States Patent and Trademark Office*